US010899259B2

(12) United States Patent
Krimmer

(10) Patent No.: US 10,899,259 B2
(45) Date of Patent: Jan. 26, 2021

(54) HEADREST GUIDE ASSEMBLY

(71) Applicant: Lear Corporation, Southfield, MI (US)

(72) Inventor: Johannes Krimmer, Freising (DE)

(73) Assignee: LEAR CORPORATION, Southfield, MI (US)

( * ) Notice: Subject to any disclaimer, the term of this patent is extended or adjusted under 35 U.S.C. 154(b) by 13 days.

(21) Appl. No.: 16/171,673

(22) Filed: Oct. 26, 2018

(65) Prior Publication Data
US 2019/0126797 A1    May 2, 2019

Related U.S. Application Data

(60) Provisional application No. 62/707,284, filed on Oct. 27, 2017.

(30) Foreign Application Priority Data

Oct. 10, 2018  (DE) .................. 10 2018 217 312

(51) Int. Cl.
B60N 2/815    (2018.01)
B60N 2/818    (2018.01)
B60N 2/897    (2018.01)

(52) U.S. Cl.
CPC ............. B60N 2/815 (2018.02); B60N 2/818 (2018.02); B60N 2/897 (2018.02)

(58) Field of Classification Search
None
See application file for complete search history.

(56) References Cited

U.S. PATENT DOCUMENTS

| 4,221,430 | A | * | 9/1980 | Frobose | ................. | A47C 7/402 |
| | | | | | | 297/353 |
| 4,478,456 | A | * | 10/1984 | Mitsui | .................... | B60N 2/818 |
| | | | | | | 297/410 |
| 5,529,379 | A | * | 6/1996 | Stocker | .................. | B60N 2/818 |
| | | | | | | 297/410 |
| 6,062,645 | A | | 5/2000 | Russell | | |
| 6,068,337 | A | * | 5/2000 | De Filippo | ............ | B60N 2/815 |
| | | | | | | 297/391 |
| 6,655,742 | B1 | * | 12/2003 | Ozaki | .................... | B60N 2/815 |
| | | | | | | 297/410 |
| 6,742,846 | B1 | * | 6/2004 | Isaacson | ................ | B60N 2/815 |
| | | | | | | 297/410 |

(Continued)

FOREIGN PATENT DOCUMENTS

EP    0770518 A2 *  5/1997  ............ B60N 2/809
EP    1 473 188 A1   11/2004

*Primary Examiner* — David E Allred
(74) *Attorney, Agent, or Firm* — Brooks Kushman P.C.

(57) ABSTRACT

A headrest guide assembly is provided for use with a headrest having a headrest rod. The headrest guide assembly includes a guide sleeve body for receiving the headrest rod and a lock assembly for selectively locking the headrest rod in the guide sleeve body. The lock assembly may include an engagement member that is engageable with the headrest rod, and a first biasing member that is configured to bias the engagement member in a first direction for engagement with the headrest rod. The lock assembly may further comprise a button that is engageable with the engagement member for moving the engagement member in a second direction opposite the first direction, and a second biasing member that is configured to bias the button away from the engagement member.

14 Claims, 4 Drawing Sheets

(56) References Cited

U.S. PATENT DOCUMENTS

| | | | | |
|---|---|---|---|---|
| 6,761,409 B2* | 7/2004 | Ford | ................. | B60N 2/818 |
| | | | | 297/410 |
| 6,802,565 B2* | 10/2004 | Isaacson | ............. | B60N 2/815 |
| | | | | 297/410 |
| 7,159,946 B2 | 1/2007 | Gurtatowski et al. | | |
| 7,204,558 B2* | 4/2007 | Tanaka | ............... | B60N 2/818 |
| | | | | 297/410 |
| 7,338,130 B2* | 3/2008 | Daume | ............... | B60N 2/815 |
| | | | | 297/410 |
| 7,789,465 B2* | 9/2010 | Reel | ................. | B60N 2/815 |
| | | | | 297/410 |
| 8,297,705 B2* | 10/2012 | Brunner | ............. | B60N 2/815 |
| | | | | 297/410 |
| 8,313,148 B2* | 11/2012 | Lardies | ............. | B60N 2/815 |
| | | | | 297/410 |
| 10,029,596 B2* | 7/2018 | Segura | ............... | B60N 2/818 |
| 10,315,773 B1* | 6/2019 | Ahad | ............... | B64D 11/0642 |
| 2005/0077772 A1* | 4/2005 | Yamada | ............. | B60N 2/815 |
| | | | | 297/410 |
| 2005/0082893 A1* | 4/2005 | Akehi | ............... | B60N 2/818 |
| | | | | 297/410 |
| 2006/0214491 A1* | 9/2006 | Metz | ................. | B60N 2/815 |
| | | | | 297/410 |
| 2007/0267908 A1* | 11/2007 | Watanabe | ........... | B60N 2/815 |
| | | | | 297/410 |
| 2011/0025116 A1* | 2/2011 | Ledieu | ............... | B60N 2/818 |
| | | | | 297/391 |
| 2014/0145489 A1* | 5/2014 | Wang | ................. | B60N 2/809 |
| | | | | 297/410 |
| 2018/0022249 A1* | 1/2018 | Schwerma | ........... | A47C 7/38 |
| | | | | 297/410 |
| 2020/0215947 A1* | 7/2020 | Jeong, II | ............. | B60N 2/818 |

* cited by examiner

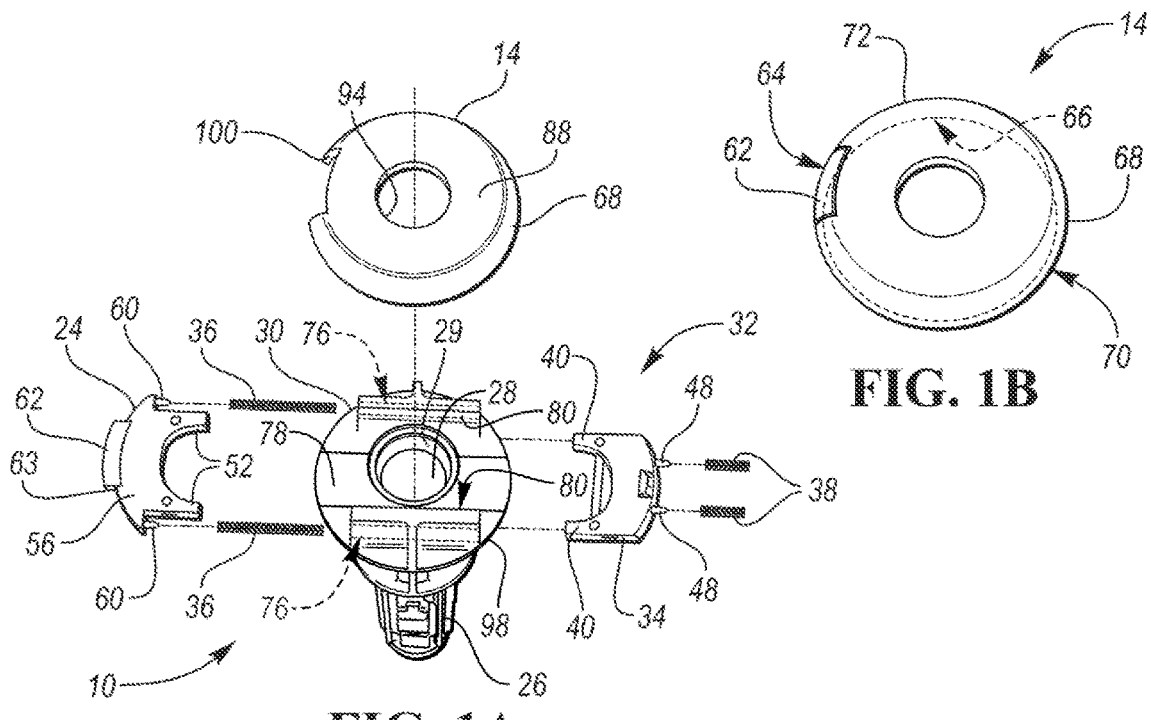
FIG. 1A
FIG. 1B
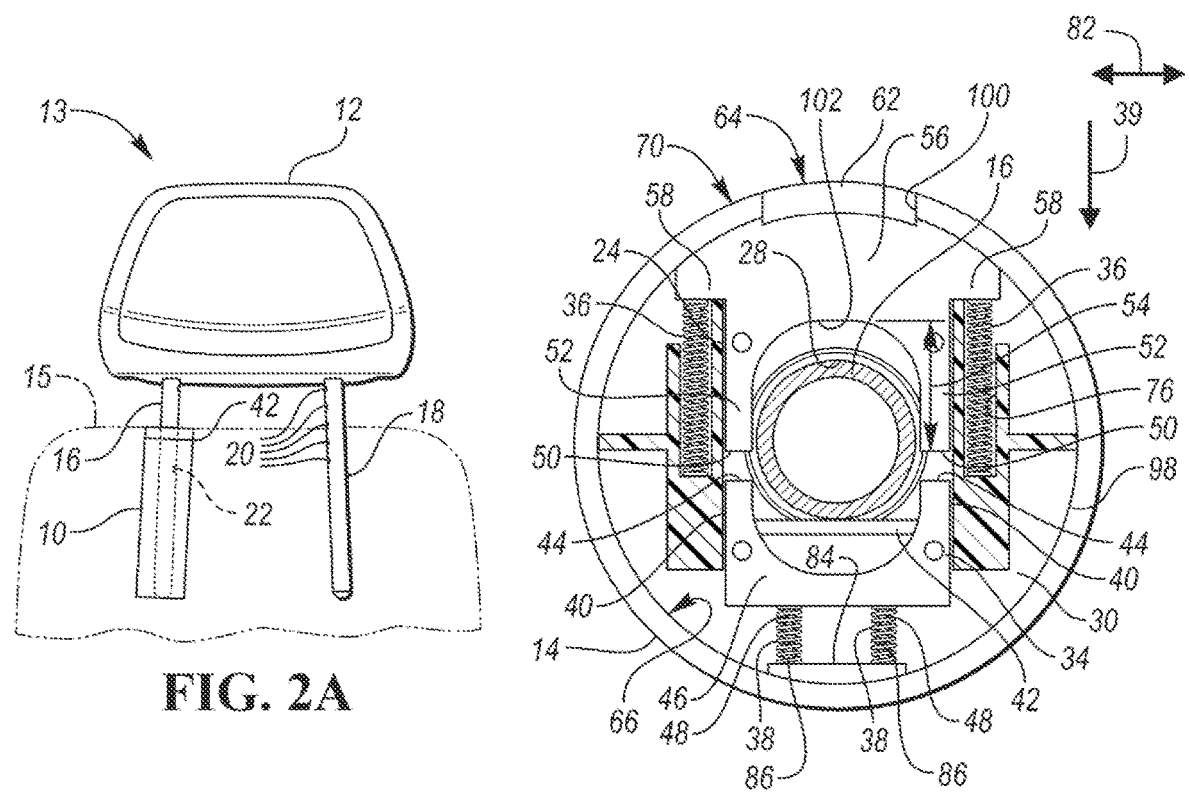
FIG. 2A
FIG. 2B

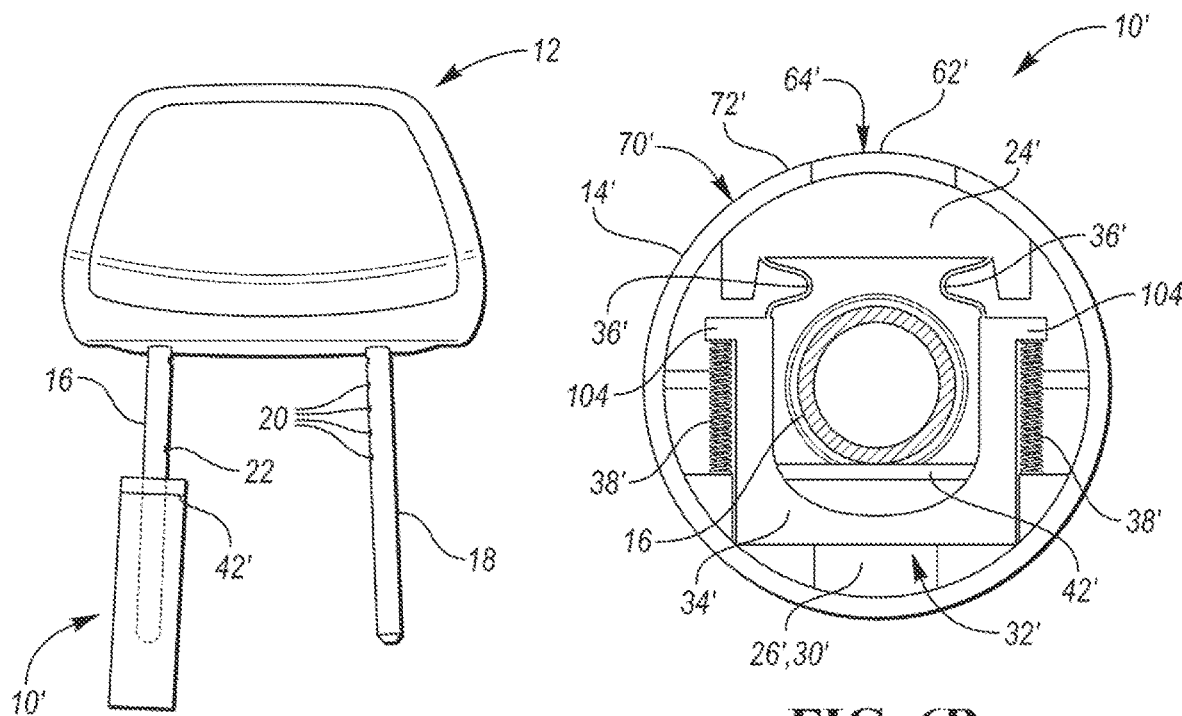
FIG. 6A  FIG. 6B
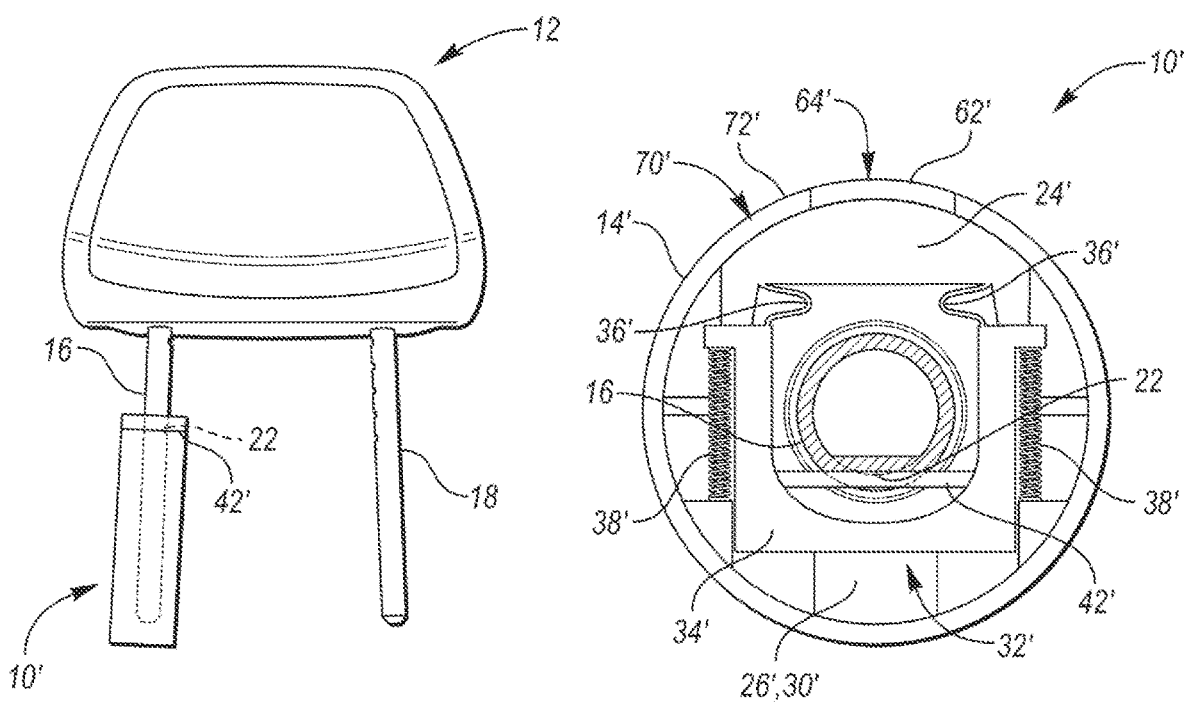
FIG. 7A  FIG. 7B

HEADREST GUIDE ASSEMBLY

CROSS-REFERENCE TO RELATED APPLICATIONS

This application claims foreign priority benefits under 35 U.S.C. § 119(a)-(d) to DE 10 2018 217 312.5, filed Oct. 10, 2018, which claims the benefit of U.S. provisional application 62/707,284 filed Oct. 27, 2017, the disclosures of which are hereby incorporated by reference in their entirety.

TECHNICAL FIELD

The disclosure relates to headrest assemblies for seats in motor vehicles.

BACKGROUND

Seats in motor vehicles may include headrest guide assemblies for movably mounting the headrest to the seat.

SUMMARY

According to at least one embodiment of the disclosure, a headrest guide assembly is provided for use with a headrest having a headrest rod. The headrest guide assembly includes a guide sleeve body for receiving the headrest rod and a lock assembly for selectively locking the headrest rod in the guide sleeve body. The lock assembly may include an engagement member that is engageable with the headrest rod, and a first biasing member that is configured to bias the engagement member in a first direction for engagement with the headrest rod. The lock assembly may further comprise a button that is engageable with the engagement member for moving the engagement member in a second direction opposite the first direction, and a second biasing member that is configured to bias the button away from the engagement member.

A vehicle seat according to the disclosure may include a seatback, a headrest having a headrest rod, and a headrest guide assembly on the seatback that includes a guide sleeve body for receiving the headrest rod, and a lock assembly for selectively locking the headrest rod in the guide sleeve body. The lock assembly may comprise an engagement member having an engaging element that is engageable with the headrest rod, and a first biasing member that biases the engagement member toward an engaged position in which the engaging element is engaged with the headrest rod. The lock assembly may further comprise a button that is engageable with the engagement member for moving the engaging element away from the headrest rod, and a second biasing member that biases the button away from the engagement member.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 1A is an exploded view of a headrest guide assembly for a headrest of a vehicle seat in accordance with an embodiment of the present disclosure;

FIG. 1B is a perspective view of a cover of the headrest guide assembly of FIG. 1A;

FIG. 2A is a front elevational view of a headrest and the headrest guide assembly of FIG. 1A in a disengaged position;

FIG. 2B is a top plan view of the headrest guide assembly of FIG. 2A in the disengaged position with a portion of the cover removed;

FIG. 6A is a front elevational view showing a headrest and a second embodiment of a headrest guide assembly mounted on a headrest rod of the headrest, wherein the headrest guide assembly is shown in a disengaged position;

FIG. 6B is a top plan view of the headrest guide assembly of FIG. 6A in the disengaged position with a portion of an associated cover removed;

FIG. 7A is a front elevational view showing the headrest guide assembly of FIG. 6A in an engaged position;

FIG. 7B is a top plan view of the headrest guide assembly of FIG. 7A in the engaged position with a portion of the cover removed;

DETAILED DESCRIPTION

Figure 3A:
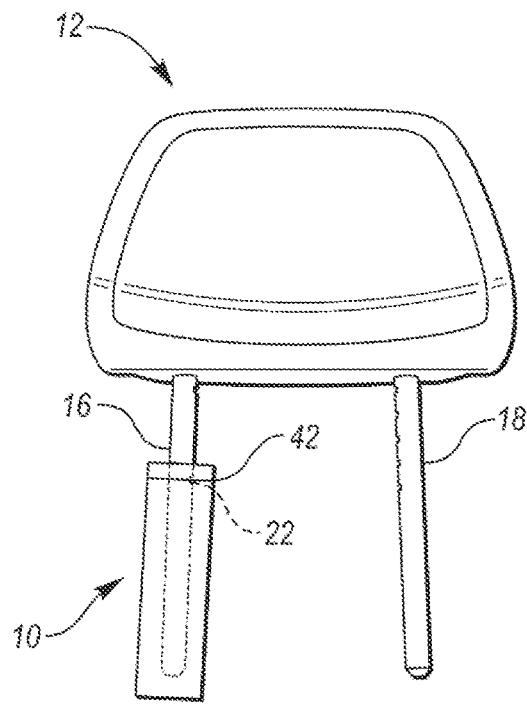
FIG. 3A is a front elevational view similar to FIG. 2A showing the headrest guide assembly of FIG. 1A in a locked position or an engaged position.

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIG. 1A is an exploded view of a headrest guide assembly 10 for a headrest 12 (shown in FIG. 2A) of a vehicle seat 13 (shown in FIG. 2A) in accordance with an embodiment of the present disclosure. FIG. 1B is a perspective view of a cover 14 of the headrest guide assembly 10 of FIG. 1A. FIG. 2A is a front elevational view showing the headrest 12 and the headrest guide assembly 10 of FIG. 1A in a disengaged position. FIG. 2B is a top plan view of the headrest guide assembly 10 of FIG. 2A in the disengaged position with a portion of the cover 14 removed. In one embodiment, the headrest 12 may be movably mounted on a seatback 15 of the seat. Referring to FIG. 2A, the headrest 12 may be an adjustable headrest 12 in which a user may adjust a height of the headrest 12 relative to a top of the seatback 15. In the illustrated embodiment, the headrest 12 has two headrest rods 16, 18. The headrest rod 18 may be a rod with a plurality of locking features, such as notches 20, formed therein for selectively adjusting the height of the headrest 12. Each notch 20 in the headrest rod 18 may correspond to a different height of the headrest 12. The headrest rod 16 may also have at least one locking feature, such as at least one notch 22, formed therein for locking the headrest 12 in place to prevent the headrest 12 from being uncoupled from the headrest guide assembly 10. One of ordinary skill in the art will understand that other headrests and headrest configurations may be used with the headrest guide assembly 10 shown in FIG. 1 in accordance with other embodiments.

Still referring to FIG. 2A, the headrest rod 16 may be received in the headrest guide assembly 10 shown in FIG. 1A, and the headrest rod 18 may be received in a headrest guide assembly (not shown) that may be the same as or similar to the headrest guide assembly 10 shown in FIG. 1A or a different headrest guide assembly, such as any suitable headrest guide assembly. In one embodiment, the headrest guide assemblies may be mounted to a bracket that is coupled to a seatback frame of the seatback 15 of the vehicle seat 13. The headrest guide assembly associated with the headrest rod 18 may be used to selectively position the headrest 12 at any one of multiple heights associated with notches 20 formed in the headrest rod 18. The headrest guide assembly 10 may be used to selectively lock the headrest rod 16 in place. As shown in FIGS. 1A and 2B, the headrest guide assembly 10 may include a button 24 that is depressible by a user to unlock the headrest rod 16 from the headrest guide assembly 10. Upon unlocking, the user may remove the headrest 12 from the headrest guide assembly 10, provided that the headrest rod 18 has also been unlocked from the other headrest guide assembly, or is otherwise movable with respect to that headrest guide assembly.

Still referring to FIGS. 1A and 2B, the headrest guide assembly 10 may include a guide sleeve body 26 for receiving the headrest rod 16. The body 26 may define a central bore 28 sized to receive the headrest rod 16. The central bore 28 may have an opening 29 at an upper end of the body 26. The body 26 may have a mounting platform 30 configured to support a lock mechanism or assembly 32 of the headrest guide assembly 10. The mounting platform 30 may surround the opening 29 and be disposed at the upper end of the body 26. The mounting platform 30 may generally lie transverse relative to a central longitudinal axis of the central bore 28. When mounted to the vehicle, the mounting platform 30 may rest on a top of the seatback 15 of the seat 13.

With continued reference to FIGS. 1A and 2B, the lock assembly 32 may include an engagement member 34, the button 24, one or more biasing members 36, and one or more biasing members 38, which may be different from the biasing members 36 such that the biasing of the biasing members 36 is independent from the biasing of the biasing members 38. The lock assembly 32 may be used for selectively locking the headrest rod 16 in the body 26. The lock assembly 32 may be disposed at the upper end of the body 26.

Still referring to FIGS. 1A and 2B, the engagement member 34 may be engageable with the notch 22 (FIG. 2A) formed in the headrest rod 16 to lock the headrest rod 16 with respect to the headrest guide assembly 10 and the seatback 15, and the engagement member 34 may be biased in a first direction toward the headrest rod 16 by the biasing members 38. The engagement member 34 may be moved by the button 24 away from the headrest rod 16 (e.g., in a second direction opposite the first direction) upon the user depressing the button 24 inwardly in a direction 39. The engagement member 34 may be generally U-shaped and include opposing legs 40 with an engaging element, such as a rod or bar 42, extending therebetween for engaging with the notch 22 (FIG. 2A) of the headrest rod 16. The opposing legs 40 may be spaced apart from one another to accommodate an outer diameter of the headrest rod 16. In the illustrated embodiment, the space between the opposing legs 40 is greater than the outer diameter of the headrest rod 16. Furthermore, in one embodiment, each of the legs 40 may project past the bar 42 toward the button 24 to enable engagement of the button 24 with engagement surfaces 44 of the engagement member 34, as will be described below in more detail. In one embodiment, the bar 42 is cylindrical; however, the bar 42 may be other shapes or sizes in other embodiments.

The engagement member 34 may further include a base 46 opposite the engagement surfaces 44 and extending between and coupling the opposing legs 40. The base 46 may be configured to engage with the biasing members 38 such that the biasing members 38 apply biasing force or pressure to the base 46 to bias the engagement member 34 toward the headrest rod 16. The engagement member 34 may have one or more projections, such as pegs 48, protruding from the base 46 away from the engagement surfaces 44, and each peg 48 may be disposed within or extend into a biasing member 38 for stabilizing the biasing member 38.

In the illustrated embodiment, two biasing members 38 are provided, and the biasing members 38 are helical or coil springs that are configured to bias the engagement member 34 toward the headrest rod 16 when the headrest rod 16 is received in the body 26. The biasing members 38 may be spaced apart from one another to contact different areas of the base 46. One of ordinary skill in the art will understand that there are other ways to bias the engagement member 34 toward the headrest rod 16. For example, and without limitation, each biasing member 38 may be a leaf spring or a magnet. Furthermore, one or more than two biasing members 38 may be utilized in other embodiments.

Still referring to FIGS. 1A and 2B, the button 24 may be engageable with the engagement member 34 for moving the engagement member 34 in a second direction away from the headrest rod 16. The button 24 may be biased away from the engagement member 34 (e.g., in the first direction) by the biasing members 36. Upon depressing the button 24 inwardly in the direction 39 toward the headrest rod 16 to overcome the biasing forces or pressures of the biasing members 36, the button 24 may move toward the headrest rod 16 such that engagement surfaces 50 of the button 24 may contact and move engagement surfaces 44 of the engagement member 34 to move the engagement member 34 away from the headrest rod 16.

The button 24 may include opposing legs 52 spaced apart from one another to define a cavity therebetween for accommodating the headrest rod 16. In the illustrated embodiment, the space between the opposing legs 52 is greater than the diameter of the headrest rod 16. Furthermore, each of the legs 52 may have a length 54 to permit the engagement surfaces 50 of the button 24 to contact and move the engagement surfaces 44 of the engagement member 34 upon moving the button 24 to a depressed position (shown in FIG. 4B, described below).

The button 24 may further include a base 56 opposite the engagement surfaces 50 and extending between and coupling the opposing legs 52. The base 56 may be configured to engage with the biasing members 36 such that the biasing members 36 apply biasing force or pressure to flanges 58 of the base 56, which project outwardly away from the opposing legs 52, to bias the button 24 away from the headrest rod 16. Each of the flanges 58 may have a projection, such as a peg 60, protruding from a flange body of the flange 58 for engaging with a respective biasing member 36 such that the peg 60 is disposed within or extends into the respective biasing member 36 for stabilization. The button 24 may also have a protrusion 62 that protrudes from an outer surface 63 (FIG. 1A) of the base 56. The outer surface 63 may contact an inner surface 66 (FIG. 1B) of a lip 68 of the cover 14, as will be described below in more detail. As shown in FIG. 2B, the protrusion 62 may be configured to align with the cover 14 in the disengaged position and in an engaged position (described in more detail below in connection with FIG. 3B) such that an outer surface 64 of the protrusion 62 is flush with an outer surface 70 of the cover 14 to form or complete a uniform outer profile 72 (FIG. 1B) of the cover 14 in the disengaged position and engaged position.

In the illustrated embodiment, two biasing members 36 are provided, and the biasing members 36 are helical or coil springs that are configured to bias the button 24 away from the headrest rod 16 when the headrest rod 16 is received in the body 26. The biasing members 36 may be disposed on opposite sides of the button 24 (adjacent the legs 52). One of ordinary skill in the art will understand that there are other ways to bias the button 24 away from the headrest rod 16. For example and without limitation, each biasing member 36 may be a leaf spring or a magnet. Furthermore, one or more than two biasing members 36 may be utilized in other embodiments.

Referring to FIGS. 1A and 2B, the mounting platform 30 of the headrest guide assembly 10 may include various features for supporting and stabilizing components of the lock assembly 32. As shown in FIG. 1A, the mounting platform 30 may define bores 76 disposed at a height above a base surface 78 of the mounting platform 30 for housing and supporting the biasing members 36. The mounting platform 30 may also have opposing side surfaces 80 that protrude upwardly from the base surface 78 for sliding engagement with the button 24 and engagement member 34. The opposing side surfaces 80 may define a channel through which the legs 52, 40 of the button 24 and engagement member 34 may travel. The opposing side surfaces 80 may also be configured to guide movement of the button 24 and engagement member 34 between the different positions. The opposing side surfaces 80 may contact the legs 52, 40 of the button 24 and engagement member 34 to restrain movement of the button 24 and engagement member 34 in directions 82 perpendicular to the directions of intended movement (i.e., direction 39 and a direction opposite the direction 39). The opposing side surfaces 80 may be part of the features that form the bores 76 for the biasing members 36. The mounting platform 30 may also have a ridge 84 disposed at an end of the platform 30 opposite the protrusion 62 of the button 24. Projecting from the ridge 84 opposite the direction 39 toward the engagement member 34 may be pegs 86 disposed within or extending into the biasing members 38 for stabilizing the biasing members 38.

Figure 5:
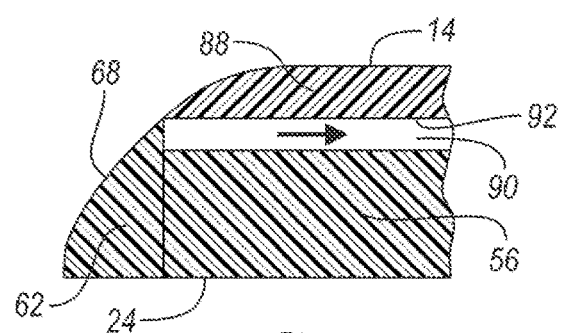
FIG. 5 is a fragmentary cross-sectional view of the cover and button of the headrest guide assembly of FIG. 1A.

Referring to FIG. 1A, the cover 14 of the headrest guide assembly 10 may be configured to house the lock assembly 32. The cover 14 may be coupled to the mounting platform 30 in any suitable manner, such as with a snap fit or an interference fit. FIG. 5 is a fragmentary cross-sectional view of the cover 14 and button 24 of the headrest guide assembly 10 of FIG. 1A. The cover 14 may have a top portion 88 with a top surface, and a lip 68 (shown also in FIG. 1B) extending downward away from the top portion 88 to define a cavity 90 (FIG. 5) formed in an underside 92 of the cover 14. As shown in FIG. 1A, the cover 14 may also define a central aperture 94 for receiving the headrest rod 16, shown in FIGS. 2A and 2B. In the illustrated embodiment and as shown in FIG. 2B, the inner surface 66 of the lip 68 extends around and abuts an outer perimeter 98 of the mounting platform 30. The cover 14 may also define a side opening 100 for receiving the protrusion 62 of the button 24. When undepressed, the protrusion 62 of the button 24 may be disposed in the opening 100 such that the outer surface 64 of the protrusion 62 is flush with the outer surface 70 of the lip 68 of the cover 14 to form or complete a uniform outer profile 72 of the cover 14, as shown in FIG. 1B. In the illustrated embodiment, the outer profile 72 of the cover 14 is generally disc-shaped with rounded edges. In other embodiments, the outer profile may have any suitable shape.

FIG. 2A schematically illustrates the headrest guide assembly 10 in the disengaged position, showing the bar 42 of the engagement member 34 relative to the notch 22 of the headrest rod 16. As shown in FIGS. 2A and 2B, when the headrest guide assembly 10 is in the disengaged position, the bar 42 of the engagement member 34 is disengaged from the notch 22 in the headrest rod 16. The headrest guide assembly 10 may be in the disengaged position when the vehicle is in operation and the headrest 12 is positioned at a height appropriate for the user and locked in place by the headrest guide assembly associated with the headrest rod 18. As shown in FIG. 2B, although the bar 42 may be biased toward the headrest rod 16 and abut an outer surface of the headrest rod 16 in the disengaged position, the button 24 may be biased away from the headrest rod 16 such that the protrusion 62 of the button 24 is flush with the cover 14, which may provide an aesthetically pleasing look.

Figure 3B:
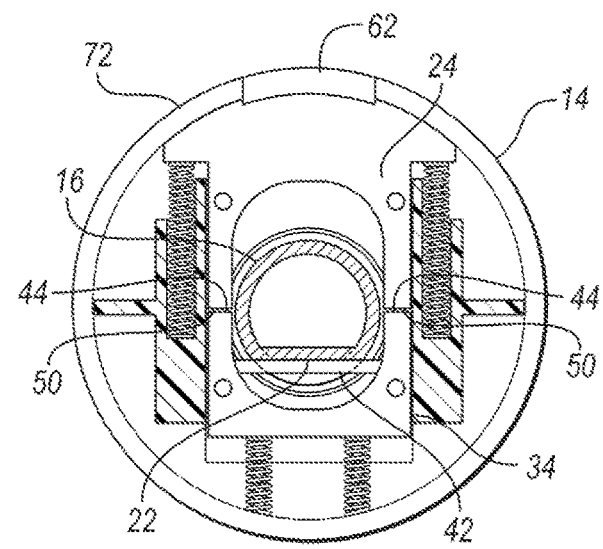
FIG. 3B is a top plan view of the headrest guide assembly of FIG. 3A in the engaged position with a portion of the cover removed.

FIG. 3A is a front elevational view showing the headrest guide assembly 10 and the headrest 12 in an engaged position, and FIG. 3B is a top plan view of the headrest guide assembly 10 of FIG. 3A in the engaged position with a portion of the cover 14 removed for clarity. The headrest guide assembly 10 may be in the engaged position when the headrest 12 is at a maximum vertical height relative to the top of the seatback 15 or when the headrest 12 is pulled past the maximum vertical height (to prevent the headrest 12 from being removed completely from the seat 13). As shown in FIG. 3B, in the engaged position, the bar 42 of the engagement member 34 may be engaged with or disposed within the notch 22 of the headrest rod 16 so that the headrest rod 16 is locked with respect to the headrest guide assembly 10. While the engagement member 34 may be engaged with the headrest rod 16, the button 24 may still be biased away from the headrest rod 16 such that the protrusion 62 of the button 24 remains flush with the cover 14 to retain the aesthetically pleasing look. Furthermore, when the headrest guide assembly 10 is in the engaged position, the button 24 and engagement member 34 may be sized and/or shaped such that the engagement surfaces 44, 50 do not interfere with each other. In the illustrated embodiment, there is a small gap between the engagement surfaces 44, 50 in the engaged position.

Figure 4A:
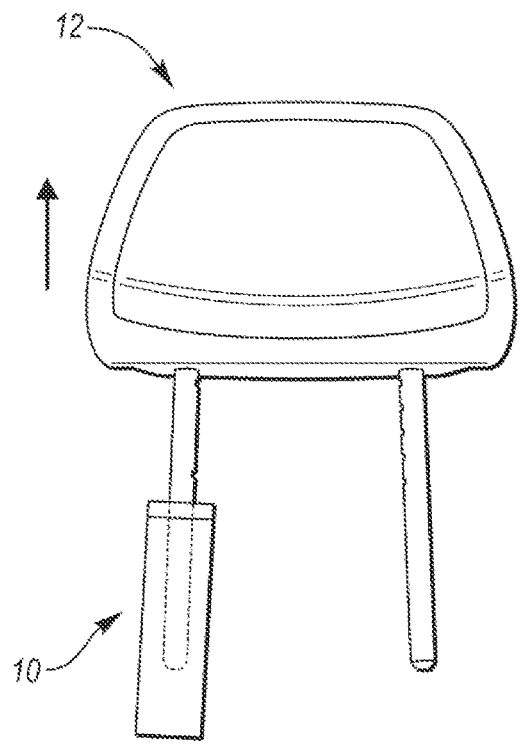
FIG. 4A is a front elevational view similar to FIG. 2A showing the headrest guide assembly of FIG. 1A in an unlocked position after a button of the headrest guide assembly has been moved to a depressed position.
Figure 4B:
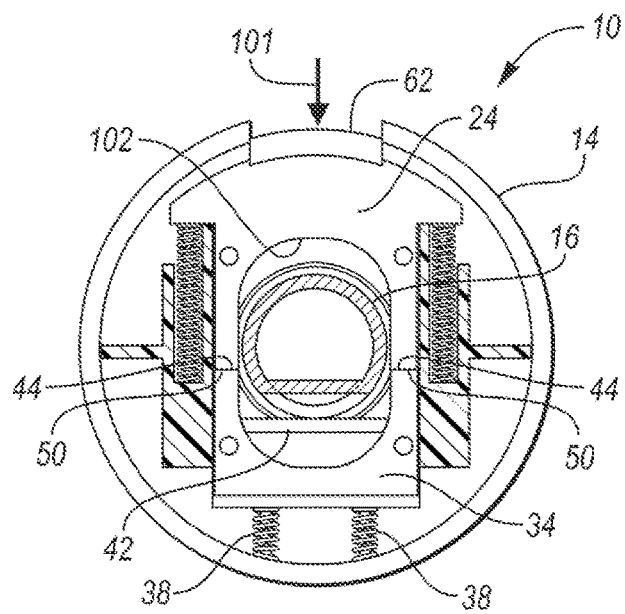
FIG. 4B is a top plan view of the headrest guide assembly of FIG. 4A in the depressed position with a portion of the cover removed.

FIG. 4A is a front elevational view similar to FIG. 2A showing the headrest 12 unlocked from the headrest guide assembly 10 after the button 24 of the headrest guide assembly 10 has been moved to a depressed position, and FIG. 4B is a top plan view of the headrest guide assembly 10 of FIG. 4A in the depressed position with a portion of the cover 14 removed for clarity. FIG. 4A schematically illustrates the headrest guide assembly 10 with the bar 42 of the engagement member 34 positioned below the notch 22 of the headrest rod 16 as the headrest 12 is being removed from the headrest guide assembly 10. The user may move the button 24 to the depressed position to uncouple or remove the headrest 12 from the seat. In the depressed position, the headrest rod 16 may move freely within the guide sleeve body 26 (FIG. 1A). As shown in FIG. 4B, in the depressed position, the engagement surfaces 44, 50 contact or engage with one another such that the button 24 moves the engagement member 34 away from the headrest rod 16 (i.e., the force or pressure 101 applied by the user on the button 24 and transferred from the button 24 to the engagement member 34 overcomes the biasing pressure of the biasing members 38). Furthermore, an inner surface 102 of the button 24 adjacent the headrest rod 16 is configured so as not to interfere with or contact the headrest rod 16 upon moving to the depressed position. In the illustrated embodiment, the inner surface 102 of the button 24 is arcuate to accommodate the shape of the headrest rod 16.

By splitting the button 24 and engagement member 34 into two parts, with each part being independently biased, the portion of the button 24 that protrudes from the cover 14, or into the opening 100 of the cover 14, to be accessible by the user (e.g., the protrusion 62) may be flush with the outer profile 72 of the cover 14 in the disengaged and engaged positions to provide or form a uniform outer profile 72 and to give a more aesthetically pleasing look. As shown in FIG. 1B, there may be a small gap between the outer surface of the protrusion 62 and the outer surface 70 of the cover 14 for clearance.

Although the illustrated embodiment shows the bases 46, 56 of the button 24 and engagement member 34 disposed on opposite sides of the headrest rod 16, the bases 46, 56 of the button 24 and engagement member 34 may be disposed adjacent to one another and on the same side of the rod 16 with the notch 22 being disposed on the same side as the protrusion 62.

Referring to FIGS. 6A-8B, a second embodiment 10' of a headrest guide assembly according to the disclosure is shown for use with a headrest, such as the headrest 12. The headrest guide assembly 10' includes similar features as the headrest guide assembly 10, and those similar features are identified with the similar reference numbers, except the similar reference numbers in FIGS. 6A-8B each include a prime mark. Therefore, the following description will primarily focus on the differences between the headrest guide assembly 10' and the headrest guide assembly 10. For example, the headrest guide assembly 10' has a lock assembly or mechanism 32' that includes a button 24' and an engagement member 34' that may be formed as one piece along with one or more integral biasing members 36', such as spring members (e.g., helical springs, leaf springs, etc.). For example, the button 24', engagement member 34' and biasing members 36' may be integrally formed from plastic in an injection molding process. As another example, the biasing members 36' may be formed separately, and then inserted into a mold in which the button 24' and engagement member 34' may be molded around the biasing members 36' to form a single piece structure.

The lock mechanism 32' may further include one or more biasing members 38', such as spring members (e.g., helical springs, leaf springs, etc.), for biasing the engagement member 34' in a first direction toward the headrest rod 16 of the headrest 12. In the illustrated embodiment, the lock mechanism 32' includes two biasing members 38' that are each engaged with guide sleeve body 26' and the engagement member 34'. Specifically, each biasing member 38' has a first end engaged with a flange 104 of the engagement member 34', and a second end engaged with a projection or stop formed on mounting platform 30' of the guide sleeve body 26'.

Although the button 24', engagement member 34' and biasing members 36' may be formed as one piece, the button 24' and the engagement member 34' are nonetheless movable with respect to each other. In that regard, the button 24' and the engagement member 34' may be movable in a similar manner as the button 24 and the engagement member 34 described above with respect to the headrest guide assembly 10. For example, the button 24' may be moved toward the engagement member 34' when a user depresses the button 24' inwardly (e.g., in a second direction opposite the first direction) with her finger, which may cause the biasing members 36' to be compressed. Furthermore, the biasing force (e.g., spring force) of the biasing members 36' may be selected to be less than the biasing force (e.g., spring force) of the biasing members 38' so that movement of the button 24' toward the engagement member 34' does not cause movement of the engagement member 34' until the button 24' has been moved a sufficient amount (e.g., when the biasing members 36' have been sufficiently compressed and/or when the button 24' has engaged the engagement member 34').

Figure 8A:
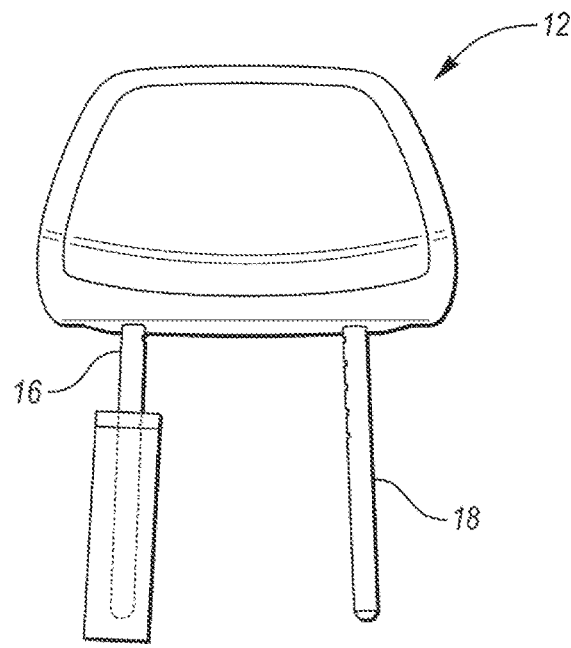
FIG. 8A is a front elevational view schematically showing the headrest guide assembly of FIG. 7A in an unlocked position, with the button on the headrest guide assembly in a depressed position.
Figure 8B:
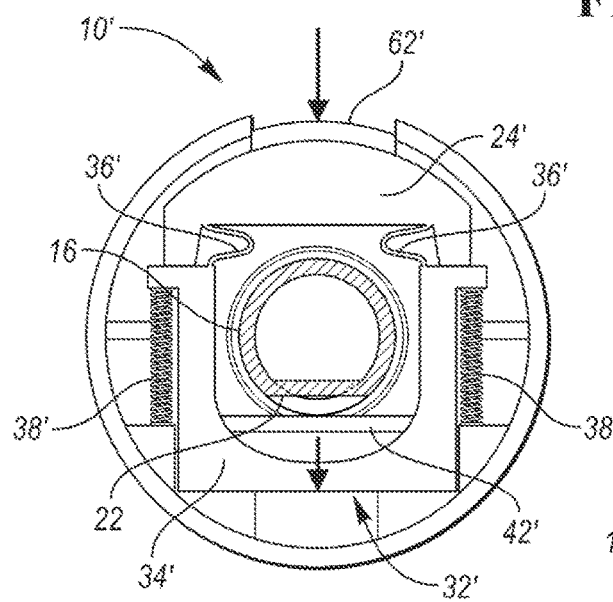
FIG. 8B is a top plan view of the headrest guide assembly of FIG. 8A in the depressed position with a portion of the cover removed.

Similar to the headrest guide assembly 10, the headrest guide assembly 10' is movable between a disengaged position shown in FIGS. 6A and 6B, an engaged position shown in FIGS. 7A and 7B, and a depressed position shown in FIGS. 8A and 8B. In the disengaged position, engaging element 42' (e.g., rod or bar) of engagement member 34' is disengaged from the notch 22 or other locking feature of the headrest rod 16, but the engaging element 42' is biased toward the headrest rod 16 by the biasing members 38'. Furthermore, the engaging element 42' may be engaged with an outer surface of the headrest rod 16, above or below the notch 22, when the headrest guide assembly 10' is in the disengaged position.

Referring to FIGS. 7A and 7B, the engaging element 42' is engaged with the notch 22 when the headrest guide assembly 10' is in the engaged position. Furthermore, the engagement member 34' is moved toward the button 24', and may be in contact with button 24', due to biasing force of the biasing members 38'.

In order to move the headrest guide assembly 10' from the engaged position to the depressed position shown in FIGS. 8A and 8B, the user may depress the button 24' inwardly a sufficient amount to cause the engagement member 34' to disengage from the notch 22, as shown in FIG. 8B. For example, the user may depress the button 24' so that the button 24' moves against the biasing force of the biasing members 36' and engages the engagement member 34' and moves the engagement member 34' against the bias of the biasing members 38' until the engaging element 42' has sufficiently disengaged from the notch 22.

Furthermore, referring to FIGS. 6B and 7B, protrusion 62' of button 24' may be aligned with cover 14' so that an outer surface 64' of the protrusion 62' is flush with an outer surface 70' of the cover 14' to form or complete a uniform outer profile 72' of the cover 14' when the headrest guide assembly 10' is in the disengaged position, shown in FIG. 6B, and the engaged position, shown in FIG. 7B.

Figure 9:
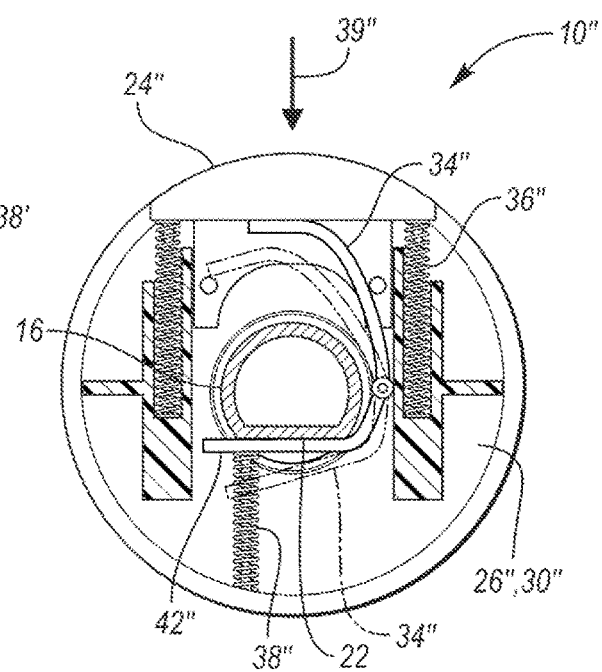
FIG. 9 is a top plan view, similar to FIG. 8B, of another embodiment of a headrest guide assembly according to the disclosure.

FIG. 9 shows another embodiment 10" of a headrest guide assembly according to the disclosure, which includes a lock mechanism or assembly with a pivotable or rotatable engagement member 34" that is rotatable between an engaged position (shown in solid lines in FIG. 9), in which an engaging element portion 42" of the engaging member is engaged with a notch 22 formed in a headrest rod 16, and a disengaged position (shown in phantom lines in FIG. 9), in which the engaging element 42" is disengaged from the notch 22 of the headrest rod 16. In the illustrated embodiment, the engagement member 34" is pivotally mounted on mounting platform 30" of guide sleeve body 26" with a pivot shaft. The locking mechanism may further include a button 24", which may be similar to the button 24 of the lock assembly 32 of the head rest guide assembly 10, and that is movable (e.g., depressible) in a direction 39" to engage the engagement member 34" in order to rotate the engagement member 34" (e.g., counterclockwise) from the engaged position to the disengaged position. In the illustrated embodiment, the button 24" includes a main body that is positioned below the engagement member 34", and a raised portion extending upwardly from the main body and that is engageable with a portion of the engagement member 34" (e.g., actuation portion) in order to rotate the engagement member 34". Furthermore, the headrest guide assembly 10" may include one or more biasing members 38" (e.g., springs) that are configured to bias the engagement member 34" in a first direction (e.g., clockwise) to bias the engaging element 42" toward the headrest rod 16, and one or more biasing members 36" (e.g., springs) that are configured to bias the button 24" away from the engagement member 34" (e.g., in a direction opposite the direction 39").

The below paragraphs describe general aspects that may be included in embodiments according to the disclosure.

According to at least one embodiment of the disclosure, a headrest guide assembly is provided for use with a headrest having a headrest rod. The headrest guide assembly may include a guide sleeve body for receiving the headrest rod and a lock assembly for selectively locking the headrest rod in the guide sleeve body. The lock assembly may comprise an engagement member that is engageable with the headrest rod, and a first biasing member configured to bias the engagement member in a first direction for engagement with the headrest rod. The lock assembly may further comprise a button that is engageable with the engagement member for moving the engagement member in a second direction opposite the first direction, and a second biasing member configured to bias the button away from the engagement member.

The engagement member and the button of the above headrest guide assembly may be connected together by the second biasing member. Furthermore, the engagement member, the button and the second biasing member may be formed as one piece.

The lock assembly of the above headrest guide assembly may comprise a cover that is attachable to an upper end of the guide sleeve body for covering the lock assembly. The cover may define a side opening for receiving at least a portion of the button, wherein an outer surface of the button is flush with an outer surface of the cover when the button is undepressed.

The button and engagement member of the above headrest guide assembly may be configured to translate or move along the same horizontal plane upon moving to a depressed position such that upon moving the button to the depressed position, the button contacts and moves the engagement member in the same direction to the depressed position.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A headrest guide assembly for use with a headrest having a headrest rod, the headrest guide assembly comprising:
   a guide sleeve body for receiving the headrest rod; and
   a lock assembly for selectively locking the headrest rod in the guide sleeve body, the lock assembly including
      an engagement member that is engageable with the headrest rod;
      a first biasing member that is configured to bias the engagement member in a first direction for engagement with the headrest rod;
      a button that is engageable with the engagement member for moving the engagement member in a second direction opposite the first direction; and
      a second biasing member that is configured to bias the button away from the engagement member;
      wherein the button is configured to directly engage the engagement member independently of the first and second biasing members, and wherein the engagement member, the button and the second biasing member are formed as one piece.

2. The headrest guide assembly of claim 1 wherein the engagement member and the button are connected together along a line in the first direction by the second biasing member.

3. The headrest guide assembly of claim 1 wherein the engagement member comprises two spaced-apart legs that each have an engagement surface engageable with the button, and an engaging element extending between the legs and engageable with the headrest rod.

4. The headrest guide assembly of claim 3 wherein the engagement member further comprises a base that is opposite the engagement surfaces and extends between the legs for engaging with the first biasing member.

5. The headrest guide assembly of claim 4 wherein the engagement member comprises a peg that protrudes from the base and into the first biasing member for stabilizing the first biasing member.

6. The headrest guide assembly of claim 3 wherein each of the legs of the engagement member projects past the engaging element toward the button to enable engagement of the button with the engagement surfaces of the legs.

7. The headrest guide assembly of claim 1 further comprising a cover for housing the lock assembly, the cover having a side opening, wherein the button has a base and a protrusion that protrudes from the base, and wherein the side opening of the cover is configured to receive the protrusion.

8. The headrest guide assembly of claim 7 wherein the cover has a cover outer surface and the protrusion has a protrusion outer surface, and wherein the protrusion outer surface is flush with the cover outer surface when the headrest rod is received in the headrest guide assembly and the headrest guide assembly is in a disengaged position in which the engagement member is disengaged from a locking feature of the headrest rod.

9. The headrest guide assembly of claim 7 wherein the cover has a cover outer surface and the protrusion has a protrusion outer surface, and wherein the protrusion outer surface is flush with the cover outer surface when the headrest rod is received in the headrest guide assembly and the headrest guide assembly is in an engaged position in which the engagement member is engaged with a locking feature of the headrest rod.

10. The headrest guide assembly of claim 1 wherein the guide sleeve body comprises a mounting platform that is disposed at an upper end of the guide sleeve body to support the lock assembly.

11. The headrest guide assembly of claim 10 wherein the mounting platform comprises a peg that extends into the first biasing member for stabilizing the first biasing member.

12. A vehicle seat comprising:
- a seatback;
- a headrest having a headrest rod; and
- a headrest guide assembly on the seatback that includes a guide sleeve body for receiving the headrest rod, and a lock assembly for selectively locking the headrest rod in the guide sleeve body,
- wherein the lock assembly includes
  - an engagement member having an engaging element that is engageable with the headrest rod;
  - a first biasing member that biases the engagement member toward an engaged position in which the engaging element is engaged with the headrest rod;
  - a button that is engageable with the engagement member for moving the engaging element away from the headrest rod; and
  - a second biasing member that biases the button away from the engagement member;
  - wherein the first biasing member is spaced away from the button, and wherein the engagement member, the button and the second biasing member are formed as one piece or are integrally molded together into one piece.

13. The vehicle seat of claim 12 wherein the engagement member extends between the first biasing member and the button, and wherein the first biasing member has a first end in direct contact with the engagement member and a second end in direct contact with the guide sleeve body.

14. A headrest guide assembly for use with a headrest having a headrest rod, the headrest guide assembly comprising:
- a guide sleeve body for receiving the headrest rod; and
- a lock assembly for selectively locking the headrest rod in the guide sleeve body, the lock assembly including
  - an engagement member that is engageable with the headrest rod;
  - a first biasing member that is configured to bias the engagement member in a first direction for engagement with the headrest rod;
  - a button that is engageable with the engagement member for moving the engagement member in a second direction opposite the first direction; and
  - a second biasing member that is configured to bias the button away from the engagement member;
  - wherein the button is configured to directly engage the engagement member independently of the first and second biasing members, the engagement member and the button are connected together by the second biasing member, and the engagement member, the button and the second biasing member are formed as one piece.

* * * * *